US012676326B2

(12) United States Patent (10) Patent No.: US 12,676,326 B2
Gogna et al. (45) Date of Patent: Jul. 7, 2026

(54) PREDICTIVE FREEZE PREPARATION SCHEDULING FOR FUEL CELL PROPULSION SYSTEM

(71) Applicant: FORD GLOBAL TECHNOLOGIES, LLC, Dearborn, MI (US)

(72) Inventors: Naginder Gogna, Northville, MI (US); Jason Meyer, Canton, MI (US); Rajit Johri, San Francisco, CA (US); Hao Wang, Ann Arbor, MI (US); Ming Cheng, Northville, MI (US); William Frederick Sanderson, Jr., Commerce Township, MI (US); Zeng Qiu, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 699 days.

(21) Appl. No.: 18/171,756

(22) Filed: Feb. 21, 2023

(65) Prior Publication Data

US 2023/0268525 A1 Aug. 24, 2023

Related U.S. Application Data

(60) Provisional application No. 63/312,340, filed on Feb. 21, 2022.

(51) Int. Cl.
| | |
|---|---|
| *H01M 8/04119* | (2016.01) |
| *H01M 8/04111* | (2016.01) |
| *H01M 8/04225* | (2016.01) |
| *H01M 8/04746* | (2016.01) |
| *H01M 16/00* | (2006.01) |
| *B60L 58/40* | (2019.01) |

(52) U.S. Cl.
CPC .... *H01M 8/04179* (2013.01); *H01M 8/04111* (2013.01); *H01M 8/04225* (2016.02); *H01M 8/04753* (2013.01); *H01M 16/006* (2013.01); *B60L 58/40* (2019.02); *H01M 2250/20* (2013.01); *H01M 2250/402* (2013.01)

(58) Field of Classification Search
CPC ......... H01M 8/04179; H01M 8/04225; H01M 8/04111; H01M 8/04753; H01M 16/006; H01M 2250/20; H01M 2250/402; B60L 58/40
USPC ........................................... 429/9
See application file for complete search history.

(56) References Cited

U.S. PATENT DOCUMENTS

| | | | |
|---|---|---|---|
| 2015/0099200 A1* | 4/2015 | Staley | B60L 58/32 |
| | | | 429/413 |
| 2019/0214662 A1* | 7/2019 | Riley | H01M 8/04358 |
| 2019/0291666 A1* | 9/2019 | Martin | B60H 1/3233 |

(Continued)

*Primary Examiner* — James M Erwin

(74) *Attorney, Agent, or Firm* — David B. Kelley; Brooks Kushman P.C.

(57) ABSTRACT

The disclosure relates to a vehicle with a traction battery and a fuel cell system, and a controller programmed to purge the fuel cell system by flowing air through it to remove moisture from the fuel cell system. The controller is configured to initiate the purge based on a distance of the vehicle from a destination, a state of charge of the traction battery, and ambient temperature conditions at the destination. The freeze preparation process can be initiated when the vehicle is approaching its destination and can be predicted using connectivity and communication with off-board sources.

13 Claims, 2 Drawing Sheets

(56)    References Cited

U.S. PATENT DOCUMENTS

2021/0210777  A1 *    7/2021   Ito ..................... H01M 8/04753
2021/0367282  A1 *   11/2021   Matsuo .............. H01M 8/0432

* cited by examiner

PREDICTIVE FREEZE PREPARATION SCHEDULING FOR FUEL CELL PROPULSION SYSTEM

CROSS-REFERENCE TO RELATED APPLICATIONS

This application claims the benefit of U.S. provisional application Ser. No. 63/312,340 filed Feb. 21, 2022, the disclosure of which is hereby incorporated in its entirety by reference herein.

TECHNICAL FIELD

This disclosure relates to vehicle power systems and the control thereof.

BACKGROUND

A proton exchange membrane fuel cell may be used to power a vehicle. The reaction in such a fuel cell involves hydrogen molecules splitting into hydrogen ions and electrons at the anode and causing the electrons to pass through an external load circuit to the cathode side, where protons re-combine with oxygen and electrons to form water and release heat.

SUMMARY

In one embodiment, a vehicle includes a traction battery, a fuel cell system, and a controller programmed to perform certain functions. The controller is programmed to initiate a purge of the fuel cell system by flowing air through it to remove moisture from the system responsive to the vehicle being less than a threshold distance from its destination, the state of charge of the traction battery exceeding a threshold state of charge, and the fuel cell system being on. The controller is also programmed to preclude the purge of the fuel cell system while traveling to the destination if the state of charge is less than the threshold state of charge, and the fuel cell system is on.

Additionally, the controller is programmed to restart the fuel cell system if the distance is less than the threshold distance, the state of charge exceeds the threshold state of charge, and the fuel cell system is auto stopped. The vehicle also includes a compressor that the controller can activate to initiate the purge of the fuel cell system.

In one example, a method for purging moisture from a fuel cell system in a vehicle before arriving at a destination includes operating a compressor in response to an indication that the vehicle is approaching the destination. The operation may be performed only if the state of charge of a traction battery exceeds a threshold state of charge or if the fuel cell system is on. Additionally, the method includes restarting the fuel cell system if it is auto stopped and the vehicle is approaching the destination. The indication can be based on the distance from the destination being less than a threshold distance, the time to the destination being less than a threshold time, or vehicle sensor data. The indication can also be contained in data wirelessly received by the vehicle.

In another example embodiment, a system for a vehicle includes a controller programmed to purge the fuel cell system of moisture before arriving at a destination when the time to the destination is less than a threshold time. The controller may be further programmed to purge the fuel cell system of moisture only if a state of charge of a traction battery is greater than a threshold state of charge and if the fuel cell system is on. Additionally, if the fuel cell system is auto stopped and the time to the destination is less than the threshold time, the controller may be further programmed to restart the fuel cell system. Overall, this system may provide for more efficient operation by reducing the effects of moisture accumulation in the fuel cell system.

DETAILED DESCRIPTION

Figure 1:
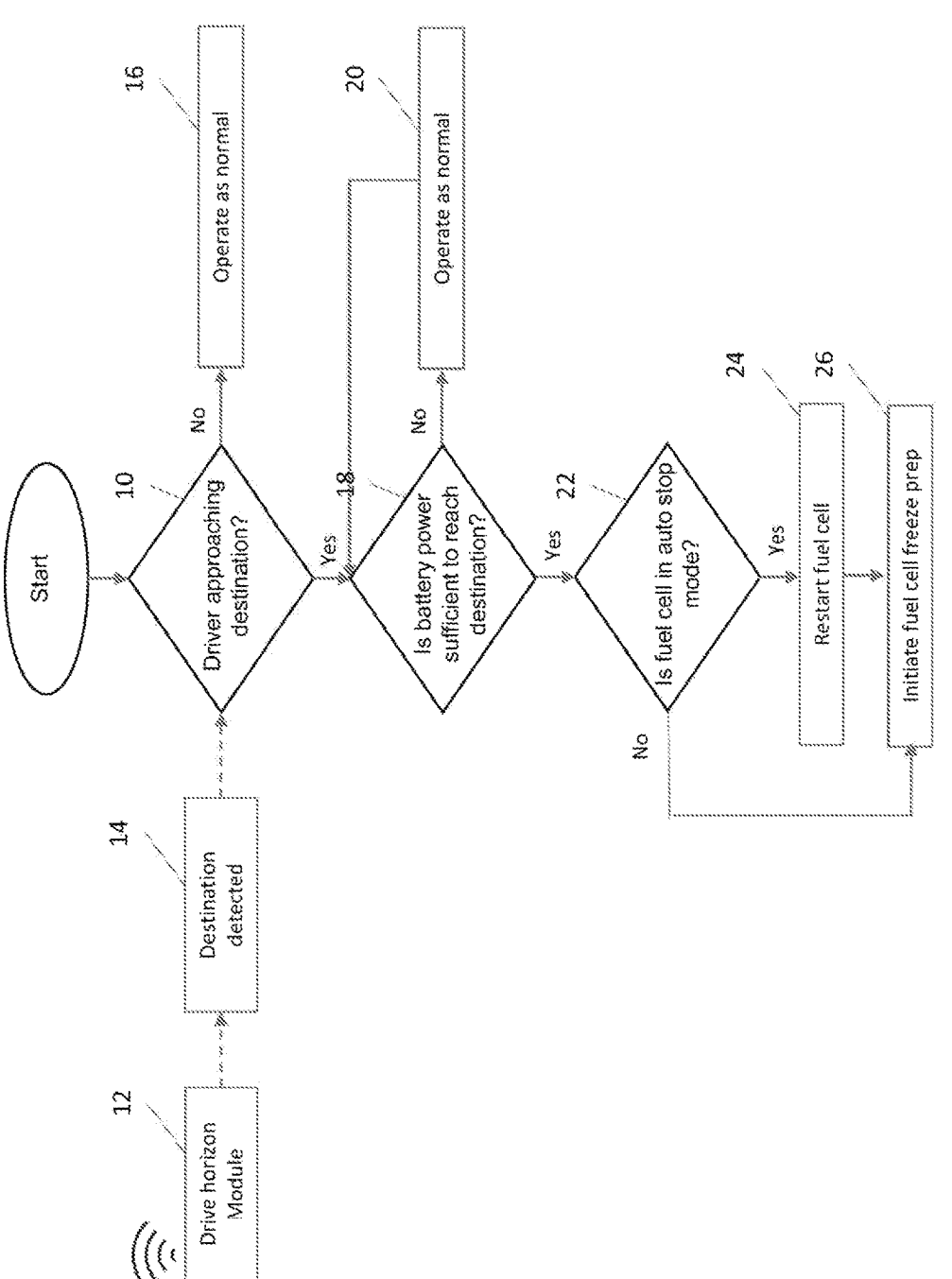
FIG. 1 is a flow chart of an algorithm for scheduling fuel cell system freeze preparation scheduling.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle fuel cell systems face the possibility of ice formation within the fuel cell system under low ambient temperature soaking conditions. Ice formation can block vents that can affect fuel cell performance. To avoid this issue, it may be helpful to purge moisture from the system before shutting down the fuel cell. This process is called freeze preparation.

In one example of freeze preparation, a compressor can be used. The freeze preparation process can also be particularly loud as the compressor runs at high speed to purge the moisture from the system. As such, performing the freeze preparation process at the end of the trip when the driver has turned off the vehicle may lead to poor customer perception. If the fuel cell is auto stopped and the vehicle is keyed off, the system needs to restart the fuel and then perform the freeze preparation actions.

With the help of connectivity (e.g., communication with off-board sources), it can be predicted if the driver is approaching its destination. Based on this information, freeze preparation can be initiated proactively while completing the rest of the remaining journey in battery electric mode only. Using this approach, the state of charge of the battery can also be brought down, which is an added benefit during the next cold start as it can enable faster fuel cell warm-up. If the fuel cell is in an auto stop mode and the vehicle is approaching the destination, the system can also proactively restart the fuel cell. The prediction that the driver is approaching their destination can be based on various information. Historical data, such as information on how long it has taken to travel a certain route in the past, could be used. Temporal data, such as time of day and current traffic conditions, can also be used to predict when a driver is approaching their destination. Additional factors such as terrain, road conditions, weather conditions, and even changes in driver behavior may be considered. In certain examples, a threshold distance may be set (e.g., 1 mile). If the vehicle is less than the threshold distance from its destination, purge of the fuel cell system may be initiated. Similarly, a threshold time may be set (e.g., 3 minutes). If the vehicle is less than the threshold time from its destination, purge of the fuel cell system may be initiated. Navigation equipment could be used to make such determinations as they typically identify vehicle location relative to its destination, and estimate a time of arrival. Other scenarios are also contemplated.

Referring to FIG. 1, at decision block 10, it is determined whether the vehicle is approaching its destination. This determination is made based on data received, in this example, wirelessly from a cloud server via a transceiver on the vehicle. In one example, location data and destination data is sent from the vehicle via the transceiver to the cloud. The cloud then returns distance to destination information. If the distance is greater than a predefined threshold distance (e.g., 4 miles), as detected by a drive horizon module 12 and destination detected operation 14, the result of decision block 10 is NO. The algorithm then proceeds to operation 16 in which the fuel cell system continues to operate as normal. In normal operation, the vehicle is precluded from fuel cell freeze preparation. If the result of decision block 10 is YES, the algorithm proceeds to decision block 18, in which it is determined whether traction battery power is sufficient to reach the destination. The sufficiency of the traction battery power can also be determined relative to a threshold value. In one example the threshold can represent the level of traction battery charge needed to power the vehicle to the destination. In another example, standard techniques are used to determine whether the state of charge of the battery is sufficient to electrically power the vehicle to reach the destination. Testing and/or simulation can, for example, indicate that for every 1% of usable state of charge, the vehicle can travel 2 miles, etc.

If the result of decision block 18 is NO, the algorithm proceeds to operation 20 in which the fuel cell system continues to operate as normal. If the result of decision block 18 is YES, the algorithm proceeds to decision block 22 in which it is determined whether the fuel cell is in auto stop mode. In auto stop mode, the fuel cell system can be selectively stopped. If the result of decision block 22 is YES, the algorithm proceeds to operation 24 in which the fuel cell system is restarted. If the result of decision block 22 is NO, the algorithm proceeds to operation 26 in which fuel cell freeze preparation is initiated. Fuel cell freeze preparation purges the moisture from the system before shutting down the fuel cell. Fuel cell freeze preparation can include operating a compressor to purge the system of fluids.

Figure 2:
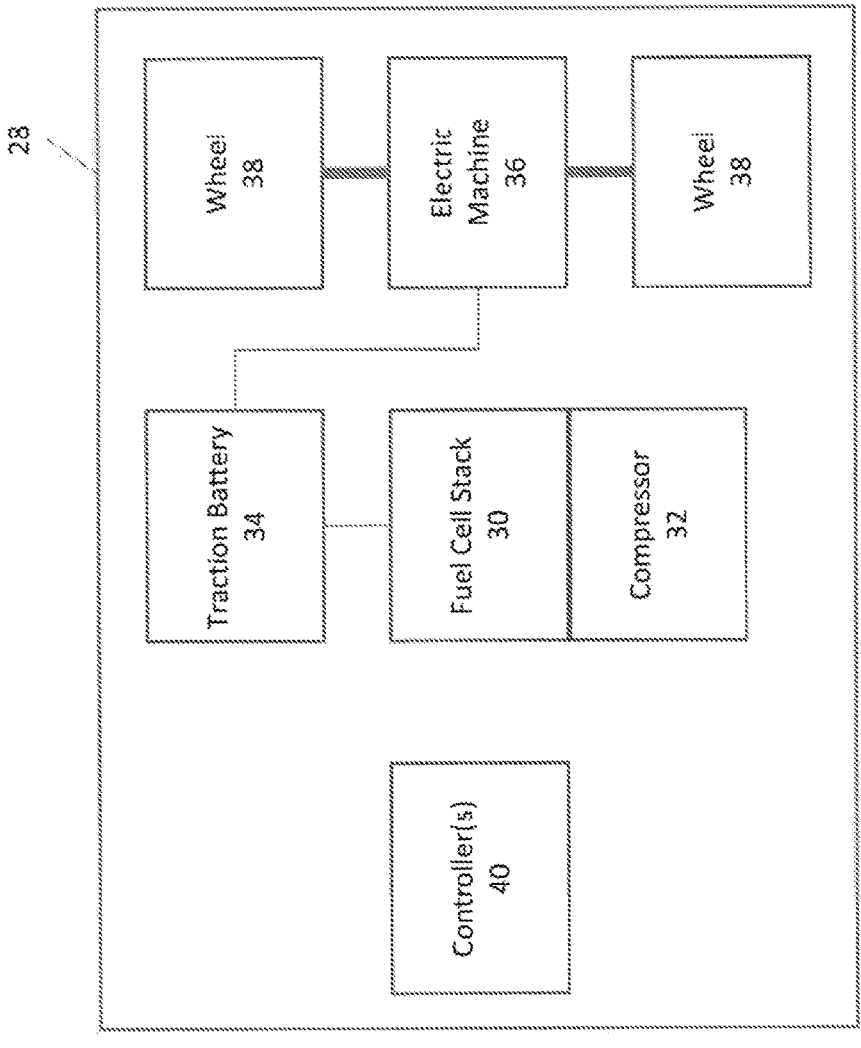
FIG. 2 is a schematic diagram of a vehicle.

Referring to FIG. 2, a vehicle 28 includes a fuel cell stack 30, a traction battery 34, an electric machine 36, wheels 38, and one or more controllers 40. The vehicle 28 can also include an associated compressor 32. The fuel cell system comprises the fuel cell stack 30, traction battery 34, and electric machine 36. The fuel cell stack 30 operates in normal fashion, consuming hydrogen and oxygen, and producing electricity in the process. This electricity may be stored in the traction battery 34 for later use by the electric machine 36, which is arranged to transform electrical energy to mechanical energy to propel the wheels 38. The fuel cell stack 30 can operate in multiple modes. In one mode corresponding to ON, the fuel cell stack 30 is generating close to full power. In auto stop mode, the fuel cell stack 30 is consuming less fuel than in then ON mode.

Freeze preparation of the fuel cell stack 30 can be done in various ways. In one example of fuel cell stack freeze preparation, air is blown through the fuel cell stack 30. The compressor 32 may operate to purge the fuel cell stack 30 of liquids and any excess moisture. The various components shown and suggested are in communication with and/or under the control of the one or more controllers 40, which can implement the algorithms contemplated herein. The controller 40 can be programmed to initiate a freeze preparation of the fuel cell stack 30. The freeze preparation initiated by the controller 40 can be a purge responsive to vehicle location data and fuel cell stack status. The controller 40 can be programmed to initiate a purge if the vehicle 28 is approaching a threshold distance, the threshold distance can be a distance relative to the vehicle's destination. The controller 40 can be programmed to change the fuel cell stack mode before initiating a purge. If the fuel cell stack 30 is in a mode besides a full power mode corresponding to ON, the controller can be configured to change the fuel cell stack mode. The controller 40 can also receive data indicating the state of charge (SOC) of the traction battery 34. The controller 40 can be further programmed to initiate a purge responsive to the SOC meeting a threshold SOC and preclude a purge if the SOC does not meet a threshold SOC. The threshold SOC can correspond to the traction battery 34 having a sufficient SOC to power the vehicle 28 to its destination. The controller 30 can further be programmed to initiate a purge based on a time threshold indicating the vehicle 28 is arriving at its destination. Instead of a time threshold, the controller 30 can be programmed to be responsive to data from a connected source indicating that the vehicle 28 is arriving at its destination. In one example, the connected source is a drive horizon module.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery;
a fuel cell system; and
a controller programmed to,
    responsive to a distance of the vehicle from a destination being less than a threshold distance, a state of charge of the traction battery exceeding a threshold state of charge, and the fuel cell system being on, initiate a purge of the fuel cell system via flow of air through the fuel cell system to remove moisture from the fuel cell system before arriving at the destination, and
    responsive to the distance being less than the threshold distance, the state of charge being less than the threshold state of charge, and the fuel cell system being on, preclude the purge of the fuel cell system while traveling to the destination.

2. The vehicle of claim 1, wherein the controller is further programmed to, responsive to the distance being less than the threshold distance, the state of charge exceeding the threshold state of charge, and the fuel cell system being auto stopped, restart the fuel cell system.

3. The vehicle of claim 1 further comprising a compressor, wherein the controller is further programmed to activate the compressor to initiate the purge of the fuel cell system.

4. A method comprising:
responsive to indication that a vehicle is approaching a destination, operating a compressor to purge moisture from a fuel cell system before arriving at the destination only if the fuel cell system is on.

5. The method of claim 4, wherein the operating is performed only if a state of charge of a traction battery exceeds a threshold state of charge.

6. The method of claim 4 further comprising, responsive to indication that the vehicle is approaching the destination and the fuel cell system is auto stopped, restart the fuel cell system.

7. The method of claim 4, wherein the indication is indicative of a distance of the vehicle from a destination being less than a threshold distance.

8. The method of claim 4, wherein the indication is indicative of a time to the destination being less than a threshold time.

9. The method of claim 4, wherein the indication is based on vehicle sensor data.

10. The method of claim 4, wherein the indication is contained in data wirelessly received by the vehicle.

11. A system for a vehicle including a fuel cell system, comprising:
a controller programmed to, responsive to a time to a destination being less than a threshold time and the fuel system being auto stopped, restart the fuel cell system and purge the fuel cell system of moisture before arriving at the destination.

12. The system of claim 11, wherein the controller is further programmed to purge the fuel cell system of moisture only if a state of charge of a traction battery is greater than a threshold state of charge.

13. The system of claim 11, wherein the controller is further programmed to purge the fuel cell system of moisture only if the fuel cell system is on.

* * * * *